United States Patent Office 3,278,454
Patented Oct. 11, 1966

3,278,454
INHIBITION OF GRAIN GROWTH IN SINTERED BERYLLIUM OXIDE BODIES
Percy P. Turner and Henry C. Brassfield, Cincinnati, Ohio, assignors to the United States of America as represented by the United States Atomic Energy Commission
No Drawing. Filed June 4, 1964, Ser. No. 374,228
5 Claims. (Cl. 252—478)

This invention relates to moderator materials for nuclear reactors and more particularly to sintered beryllium oxide bodies.

The nuclear characteristics of beryllium oxide are favorable to its use as a moderator for nuclear reactors, and its refractory nature makes this material attractive for applications in which most other moderator materials would be unsuitable, for example, in high-temperature air-cooled reactors operating at temperatures over 2500° F. Beryllium oxide has the advantages of a high melting point, exceptionally high thermal conductivity, and chemical inertness at elevated temperatures.

One of the main deterrents to the use of beryllium oxide in high-temperature reactors has been its susceptibility to excessive grain growth at elevated temperatures, resulting in deterioration of mechanical properties. At temperatures above 2500° F. beryllium oxide undergoes massive and preferential grain growth, and the strength of sintered bodies is drastically decreased. Inhibition and control of grain growth is a necessity for applications requiring significant strength in beryllium oxide bodies at service temperatures over 2500° F.

Various additives have been incorporated in sintered beryllium oxide for the purpose of inhibiting grain growth, but none has proven satisfactory. Either the extent of inhibition has been insufficient or other properties such as density have been adversely affected. A high sintered density, that is, at least 95 percent of theoretical, is required for reactor applications.

It is, therefore, an object of our invention to provide a method of inhibiting grain growth in sintered beryllium oxide bodies.

Another object is to provide a high-density, sintered beryllium oxide body resistant to grain growth.

Another object is to provide a sintered beryllium oxide body with favorable mechanical properties for service at temperatures over 2500° F.

Other objects and advantages will be apparent from the following detailed description and claims.

In accordance with our invention, grain growth in a sintered beryllium oxide body is inhibited by incorporating 1 to 4 weight percent zirconium oxide in the form of a sol in the beryllium oxide prior to sintering the body. Favorable mechanical properties in the sintered body are maintained at service temperatures up to about 2750° F. In addition, densification is promoted by this additive, with densities over 97 percent being obtained under typical conditions.

We have found that incorporation of a zirconium oxide sol in the beryllium oxide substantially restricts grain growth at elevated temperatures. Although our invention is not to be understood as limited to a particular theory, it is postulated that the colloidal nature of the $ZrO_2$ sol is characterized by a large surface area which lends itself to excellent distribution around the particulate BeO. During densification and subsequent thermal aging, the presence of $ZrO_2$ along the BeO grain boundaries limits movement and subsequent growth of the BeO grains.

A proportion of at least 1 weight percent zirconium oxide is required to effectively inhibit grain growth and maintain a high density and up to 4 weight percent may be employed; about 2 to 3 weight percent is preferred.

The zirconium oxide is incorporated in the beryllium oxide by mixing a zirconium oxide sol with finely divided beryllium oxide prior to forming the beryllium oxide into a body and densifying. The method of preparing the zirconium oxide sol is not critical, and previously known methods such as electrodialysis of an aqueous solution of zirconium tetrachloride may be employed. Zirconium oxide sol particles exhibit an extremely small size of about 0.03 to 0.07 micron in diameter. For convenience in mixing the sol with the beryllium oxide, a zirconium oxide concentration of 3 to 12 weight percent in the sol is preferred.

After mixing and plasticizing, the zirconium oxide-containing beryllium oxide may be compressed into a body of the desired configuration and sintered by the same methods employed for beryllium oxide alone. In a preferred procedure, the plasticized mix is extruded through a die in the shape of rods or tubes. After drying and prefiring to eliminate moisture and volatiles, the formed shapes are densified at about 2950° F. in hydrogen.

The method of our invention is not limited to sintered bodies of a particular configuration; and any of the moderator shapes normally employed, such as cylindrical or tubular compacts or hexagonal blocks, may be prepared by this means. This method is also applicable to inhibition of grain growth in beryllium oxide bodies containing other materials dispersed therein, for example, where beryllium oxide is employed as the matrix for a fuel element containing a dispersed fissionable or fertile oxide such as thorium oxide, uranium oxide or mixed thorium-uranium oxide. The dispersed oxide particles may also be coated with another refractory oxide to improve fission-product retention. The chemical reactivity of beryllium oxide is not materially affected by the added zirconium oxide, and previously known cladding or coating materials for beryllium oxide alone may be used for beryllium oxide bodies prepared by the present invention.

Our invention is further illustrated by the following example.

*Example*

Beryllium oxide bodies containing 0.5 to 4.0 weight percent zirconium oxide were prepared by the following procedure. Sulfate or oxalate-derived beryllium oxide prepared by chemical precipitation and calcination was mixed with a zirconium oxide sol, potato starch, and glycerin. The sol particles were 0.03 to 0.07 micron in diameter, the sol concentration being approximately 10 weight percent $ZrO_2$. The resulting mixture was extruded as tubes at a pressure of about 100 tons total ram load. Following burnout of the starch and glycerin at 1400° F., the tubes were sintered at a temperature of 2950° F. for 2 hours in hydrogen. The density of the sintered tubes was measured using the dry weight and weight suspended in water. The average grain size was determined microscopically. The tubes were then thermally aged at 2500°

F. for 150 hours in air; the grain size and modulus of rupture after heat-treatment were then determined. Grain size was also determined after aging at 2750° F. in air for 150 hours. One composition containing 0.5 weight percent magnesium oxide as a densifying agent instead of zirconium oxide was prepared and tested for purposes of comparison. Further details and results are shown in the following table.

TABLE—DENSITY, GRAIN SIZE, AND STRENGTH OF BERYLLIUM OXIDE BODIES

| BeO plus Additive Indicated, wt. percent | Density, Percent of Theoretical | Grain Size, Microns | | | Modulus of Rupture, lbs. per sq. in. | |
|---|---|---|---|---|---|---|
| | | As sintered[a] | 2,500° F., 150 hrs. | 2,750° F., 150 hrs. | As sintered | 2,500° F., 150 hrs. |
| 0.5 $ZrO_2$ | 91.4 | 9 | 20 | 35 | 31,600 | 21,500 |
| 1.0 $ZrO_2$ | 97.0 | 9 | 12 | 32 | 32,300 | 29,900 |
| 2.0 $ZrO_2$ | 97.6 | 7 | 7 | 34 | 33,900 | 30,900 |
| 3.0 $ZrO_2$ | 97.1 | 6 | 13 | 32 | 37,300 | 25,000 |
| 4.0 $ZrO_2$ | 97.9 | 10 | 20 | 23 | 37,900 | 25,800 |
| 0.5 MgO | 99.1 | 30. | 35 | 42 | 26,100 | 20,900 |

[a] Sintered 2 hours at 2950° F. in air having a dewpoint of +35° F.

It may be seen from the tabulation that strength and sintered density were substantially improved at zirconium oxide levels from 1 to 4 percent and that growth of grain size after prolonged holding at elevated temperature was decreased significantly.

The example cited is merely illustrative and is not to be understood as limiting the scope of our invention which is limited only as indicated by the appended claims.

Having thus described our invention, we claim:

1. The method of inhibiting elevated-temperature grain growth in sintered beryllium oxide bodies which comprises incorporating about 1 to 4 weight percent zirconium oxide in the form of sol particles in said beryllium oxide prior to sintering.

2. The method of claim 1 wherein the proportion of zirconium oxide is about 2 to 3 weight percent.

3. The method of preparing a high-density beryllium oxide body resistant to gross grain growth and gross loss of strength at temperatures over 2500° F. which comprises mixing finely divided beryllium oxide with a zirconium oxide sol at a proportion of about 1 to 4 weight percent zirconium oxide, extruding the resulting mixture, and sintering the resulting extruded body.

4. Moderator and fuel element matrix material for high-temperature nuclear reactors comprising a sintered beryllium oxide body having incorporated therein 1 to 4 weight percent zirconium oxide sol particles.

5. Moderator material for nuclear reactors operating at temperatures over 2500° F. consisting of a sintered beryllium oxide body having incorporated therein 1 to 4 weight percent zirconium oxide sol particles.

References Cited by the Examiner

UNITED STATES PATENTS 2,910,371  10/1959  Ryschkewitsch _____ 106—57
3,110,681  11/1963  Meadows et al. _____ 106—57 X BENJAMIN R. PADGETT, *Primary Examiner.*

L. A. SEBASTIAN, *Assistant Examiner.*